UNITED STATES PATENT OFFICE.

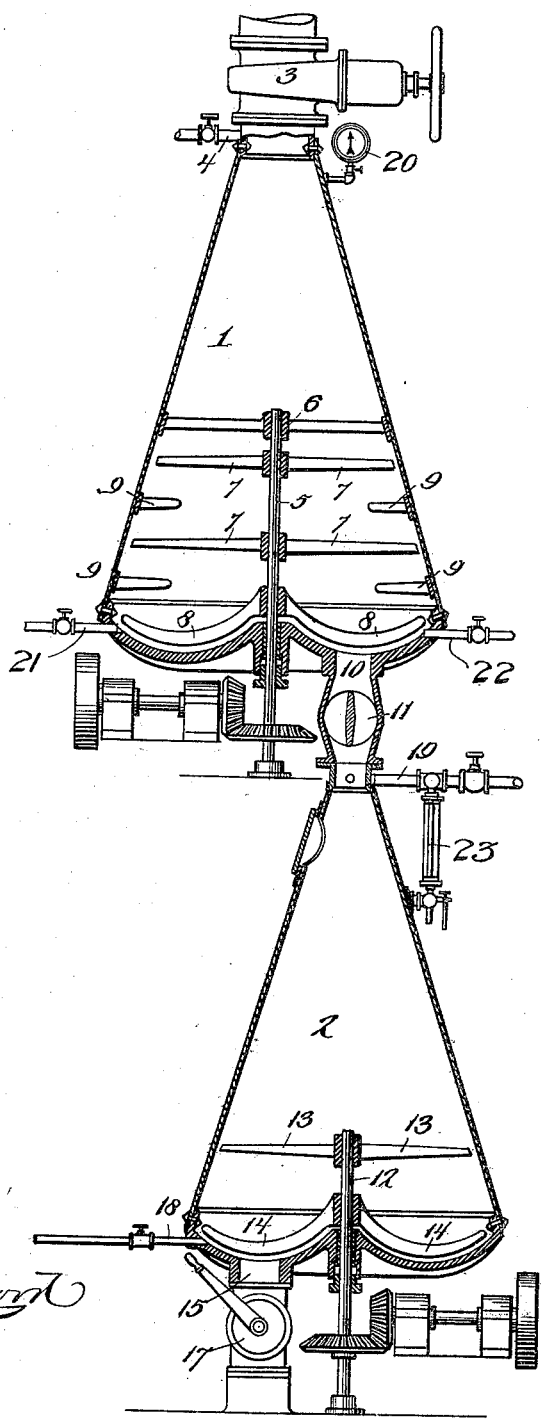

NATHANIEL B. POWTER, OF BROOKLYN, NEW YORK.

APPARATUS FOR EXTRACTING GREASE.

SPECIFICATION forming part of Letters Patent No. 668,211, dated February 19, 1901.

Application filed December 6, 1899. Serial No. 739,406. (No model.)

*To all whom it may concern:*

Be it known that I, NATHANIEL B. POWTER, a subject of the Queen of Great Britain, residing at Brooklyn, in the county of Kings and State of New York, have invented certain new and useful Improvements in Apparatus for Extracting Grease and Oil from Oil-Bearing Substances; and I do hereby declare the following to be a full, clear, and exact description of the invention, such as will enable others skilled in the art to which it appertains to make and use the same.

My invention relates to improvements in apparatus for extracting grease and oil from oil-bearing substances, and particularly from waste products—such as refuse meat, tallow, lard, tankage, garbage, town refuse, and fish waste—and from vegetable matter, such as linseed, hemp-seed, cotton-seed, cocoanuts, or any other vegetable material holding oil.

The apparatus herein described is particularly intended for the carrying out of the process of extracting grease and oil from oil-bearing substances such as those mentioned above, which forms the subject-matter of an application for Letters Patent filed by me on December 21, 1898, Serial No. 699,905, and is an improvement upon the apparatus for the same purpose forming the subject-matter of an application for Letters Patent filed December 21, 1898, Serial No. 699,906.

The objects of my invention are to avoid the collection of solid matter upon the sides of the digesters employed in the extraction of oil and grease from oil-bearing substances such as those mentioned above, to separate the grease and oil from the other substances more perfectly and without the use of screens or the like, and to make the apparatus simple, durable, effective, and inexpensive. These objects are attained in the apparatus herein described and illustrated in the drawing accompanying and forming a part of this specification, which shows in central vertical section a digester and a separator constructed in accordance with my invention.

The digesters heretofore customarily employed have been tanks which are substantially cylindrical or cylindrical with conical tapering bottoms. Much difficulty has been experienced in the use of such digesters from the clinging of the solid matter to the walls of the digester, and such digesters are not well adapted for the separation of the grease from the other substances within the digester by floating it off. In my said application, Serial No. 699,906, I have illustrated and described a digester designed to obviate these difficulties and the sides of which have the form of two cones, with their bases toward each other, the angle of the lower cone being comparatively small, so that the sides are nearly vertical and yet have sufficient taper to permit the use of a discharge-opening of reasonable size. I have found, however, that even better results may be obtained from the use of a digester the sides of which taper from the bottom upward. The solid matter does not cling so strongly to the sides of such a digester, the tendency being for such matter to fall from the sides by gravity. Moreover, in the separation of the grease from the solid impurities when the stirrers are rotated and the liquid and the impurities are caused to circulate around the digester the solid impurities are forced by centrifugal action toward the inclined sides of the digester and encountering said inclined sides are pressed downward, while the lighter and more mobile grease rises in the center. By this means a very effective separation of the grease from the solid impurities is obtained without the use of screens. The use of screens is objectionable, because they are likely to be clogged by the solid impurities and require constant scraping.

In the drawing, 1 is a digester, and 2 a separator. Both digester and separator are in form upright cones the sides of which have a slight inclination from the vertical. The bottoms of the digester and separator are preferably trough-shaped, as shown; but this is not material. The digester 1 is provided at the top with a valve 3, through which the material to be treated may be admitted. At the top of the digester is a pipe 4, to which a vacuum-pump may be connected. Suitable steam and water connections 21 and 22 are also provided. A pressure-gage 20 is also connected to the digester, near the top thereof.

5 is a vertical shaft passing through a stuffing-box in the digester and having a bearing in a strut 6.

7 7 are stirring-arms carried by the shaft 5, and 8 8 are combined stirring-arms and scrapers, likewise carried by said shaft. They are curved to correspond with the curvature of the bottom of the digester.

9 9 are fixed arms projecting from the sides of the digester and interposed between the stirring-arms.

The shaft 5 is revolved by suitable gearing.

A discharge-passage 10 connects the top of the separator 2 and the bottom of the digester 1. In this passage is a valve 11, by which the passage may be closed. The shape of the separator 2 is similar to that of the digester 1, except that the separator is smaller, for a reason hereinafter explained. The separator is provided with a stirrer-shaft 12, having stirring-arms 13 and at the bottom stirring and scraping arms 14. A discharge-passage 15 is provided, and in this discharge-passage is a valve 17. A pipe 18, through which water may be admitted through the bottom of the separator, is also provided, and near the top of the separator there is a gage-glass 23.

The extraction of the grease is carried on as follows: The digester 1 is charged with the material to be treated through the valve 3. This valve is then closed, and steam is admitted to cook the contents of the digester, the stirring-arms being rotated, so as to grind the material treated against the fixed arms 9 and disintegrate the same. The cooking is continued from three to five hours, according to the nature of the substance treated, no escape of steam or fumes being allowed. The action of the steam and of the condensed vapor and the mechanical disintegration produced by the action of the stirring-arms breaks up the fibrous structure of the matter under treatment, liberating the oils and grease, while the solid matter settles to the bottom of the digester. For the treatment of some substances dilute sulfuric acid or other suitable reducing agent may be added to the mass within the digester. When the substance being treated contains glue and similar substances, salt may be added to the mass to restrain the glue from going over with the grease. When the mass in the digester has been sufficiently treated therein, connection with the vacuum-pump is opened, and the steam and vapor are drawn off. This I do for two reasons—first, to avoid the escape of odoriferous gases, and, second, to separate from the mass of grease and oil and other substances within the digester certain light oils and grease which, I have found, will pass off with the steam-vapors when suction is applied in a practically pure condition. These oils and grease may be separated from the other vapors thrown off from the digester in any convenient way, the remaining gases being passed through a suitable furnace and thence allowed to escape. The fumes having been drawn off completely the valve 11 is opened and the contents of the digester discharged into the separator. The arms 8 sweep the contents of the digester into the discharge-opening 10, and so insures that the digester shall be emptied completely. The size of the separator is so proportioned to that of the digester that a full charge of the digester, after treatment as above described, when transferred to the separator fills the latter almost up to its top. Hence after the mass has settled down a comparatively small amount of water admitted into the separator at the bottom will raise all of the oil and grease and cause them to pass off through an outlet-pipe 19. The separator having been filled in this manner the valve 11 is closed and the stirrer-shaft 13 rotated, while a new charge may be admitted to the digester 1 and subjected to treatment therein. By the revolution of the shaft 12 and the stirring-arms thereon the contents of the separator are caused to circulate around the separator, the centrifugal action thus produced throwing to the outside the floating solid impurities, and as these impurities strike the inclined sides of the separator they are forced downward, owing to the inclination of said sides, while the more mobile grease rises in the center. As this separation of the grease and oil from the impurities takes place, water may be admitted through the pipe 18 to float the grease up in the upper contracted portion of the separator, and the valve in the pipe 19 being then opened the oil and grease may be drawn off in a nearly pure condition and quite free from solid impurities.

It will be noted that owing to the peculiar shape of the separator no screening of the grease is required in most cases. This is a very great advantage, because it is well known that it is difficult to keep a screen clear. I find that the special shape of the digester illustrated is also of great importance, because when such a digester is used far less trouble is experienced from the clinging of the matter treated to the walls than when digesters of the type formerly employed are used.

The operation of separating the grease from the solid matter conducted in the separator 2 might be conducted in the digester itself, since the digester and separator are of practically the same construction and differ merely in size; but during the process of digestion the mass in the digester settles down, so as to occupy much less volume than when first charged into the digester. To float the oil off, therefore, would require the admission of a considerable quantity of water to the digester, and all water so admitted to the digester must subsequently be evaporated in drying the solid residue in the separator 2. The admission of such an excessive quantity of water for the mere purpose of floating off the oil and grease is obviated by passing the contents of the digester, after digestion is completed, into the separator 2, the size of which bears a proper proportion to the volume occupied by a full charge of the digester, after the digestion is completed, and the use of such a separator, independent of and separate from the digester, results in an important economy both in time and in cost of treatment. After the grease has been removed from the separator 2 in the manner above described the valve 17 may be opened and the contents of the separator discharged into a suitable drier or into any other suitable vessel. The rotating arms 14 sweep the contents of the separator into the discharge-passage, and hence insure the emptying of the separator.

In my above-mentioned application, Serial No. 699,906, I have illustrated, described, and claimed the use, in connection with a digester, of a separator connected therewith, and in my above-mentioned application, Serial No. 699,905, I have claimed this process of separating the oil and grease.

Having thus completely described my invention, what I claim, and desire to secure by Letters Patent, is—

1. A vessel for the purpose specified, the sides of which are upwardly convergent substantially throughout their length, said vessel being provided with means for admitting fluid to it, with means for admitting a charge to it, and with an outlet for grease near its top and having a discharge-outlet in its bottom adapted to permit the passage of solid contents of the digester, and means for closing such opening.

2. A closed vessel for the purpose specified, the sides of which are upwardly convergent substantially throughout their length, said vessel being provided with means for admitting fluid to it, with means for admitting a charge to it and for emptying it, and with an outlet for grease near its top, and being provided with revolving stirring-arms, by the operation of which centrifugal action is produced which forces solid impurities against the inclined sides of the vessel, thereby separating such impurities from the light fluids in the digester.

3. A closed vessel for the purpose specified, the sides of which are upwardly convergent substantially throughout their length, said vessel being provided with means for admitting fluid to it, with means for admitting a charge to it and for emptying it; and with an outlet for grease near its top, and being provided with revolving stirring-arms, by the operation of which centrifugal action is produced which forces solid impurities against the inclined sides of the vessel, thereby separating such impurities from the light fluids in the digester, and being also provided with fixed arms interposed between the revolving arms, whereby solid matter in the digester may be disintegrated.

4. A vessel for the purpose specified, the sides of which are upwardly convergent substantially throughout their length, said vessel being provided with a stirrer-shaft projecting upwardly through its bottom, with a discharge-opening in its bottom to one side of said shaft, and with revolving stirring-arms and scrapers which sweep the bottom of the digester.

In testimony whereof I affix my signature in the presence of two witnesses.

NATHANIEL B. POWTER.

Witnesses:
HARRY M. MARBLE,
D. HOWARD HAYWOOD.